Nov. 22, 1955  J. W. CLARKE  2,724,324
AUTOMATIC TENSION DEVICE FOR HAY BALERS
Filed April 6, 1953  2 Sheets-Sheet 1

INVENTOR
Joseph W. Clarke
BY
ATTORNEYS

Nov. 22, 1955 J. W. CLARKE 2,724,324
AUTOMATIC TENSION DEVICE FOR HAY BALERS
Filed April 6, 1953 2 Sheets-Sheet 2
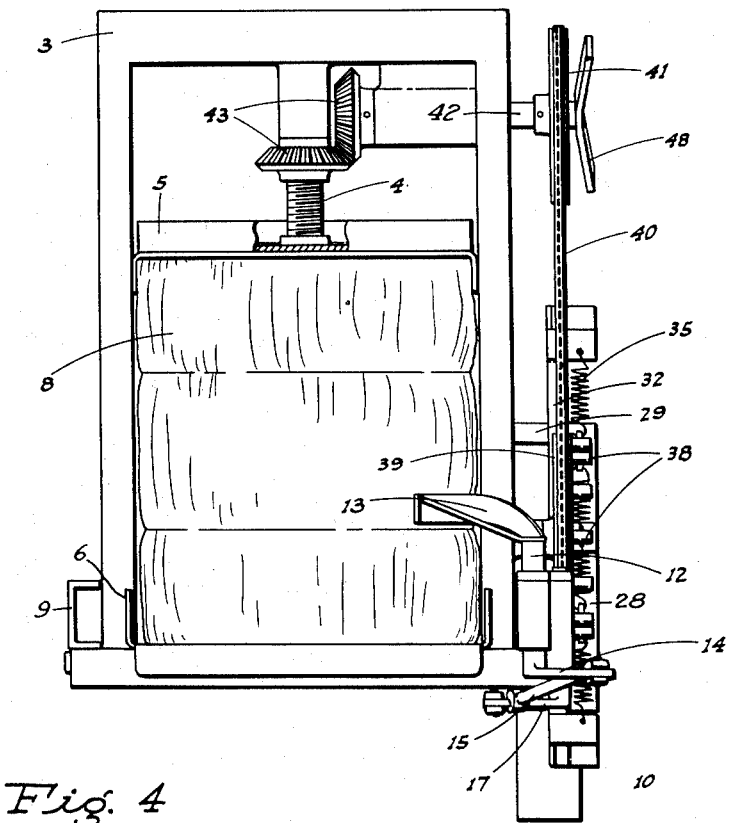
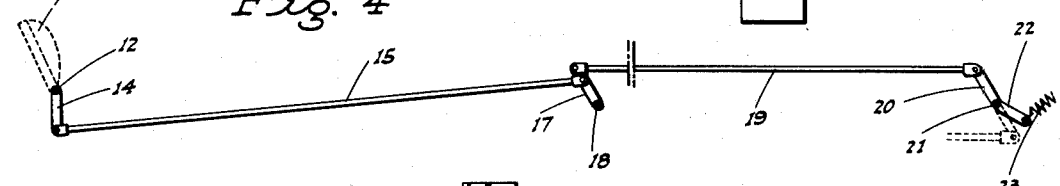
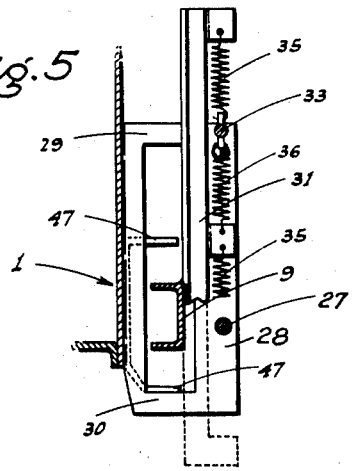
INVENTOR
Joseph W. Clarke

United States Patent Office 2,724,324
Patented Nov. 22, 1955

2,724,324

AUTOMATIC TENSION DEVICE FOR HAY BALERS

Joseph W. Clarke, Oakland, Calif.

Application April 6, 1953, Serial No. 347,030

5 Claims. (Cl. 100—43)

This invention relates generally to an improvement in hay baling machines.

In particular, the invention is directed to, and it is a major object to provide, a novel device operative to automatically adjust the tension in the baling chamber to compensate for varying hay conditions, as—for example —wet or dry hay, to the end that the hay bales may be maintained reasonably constant in weight.

Another important object of the present invention is to provide an automatic tension device, for hay balers, which functions in response to the production—by the baling machine—of a bale which is under-weight or over-weight; an under-weight or over-weight bale causing the device to increase or decrease the tension, respectively, in the baling chamber so that the next bale is increased or decreased in density and weight, as the case may be.

An additional object of the invention is to provide an automatic tension device, for hay balers, as in the preceding paragraph, wherein each bale is received on a counterbalanced scale platform; up or down motion of said platform resulting from an under-weight or over-weight bale thereon setting the parts of the device for an adjustment to increase or decrease the tension, respectively. The working of such parts is thereafter responsive to, or caused by, the forward advance of the bale on the scale platform prior to the bale discharging onto the ground.

It is also an object of the invention to provide an automatic tension device, for hay balers, which is designed for ease and economy of manufacture, and ready installation, either as an attachment to existing baling machines, or as a part of a baling machine at the time of manufacture thereof.

A further object of the invention is to provide an automatic tension device, for hay balers, which is positive in action, and one which maintains the field run of bales within very close weight tolerances.

These objects are accomplished by means of such structure and relative arrangement of parts as will fully appear by a perusal of the following specification and claims.

In the drawings:

Fig. 3 is a rear end view of the device as applied to a baling chamber on a baling machine.

Fig. 4 is a plan view, detached and foreshortened, of the connecting rod assembly.

Fig. 5 is a fragmentary transverse section on line 5—5 of Fig. 1.

Figure 2:
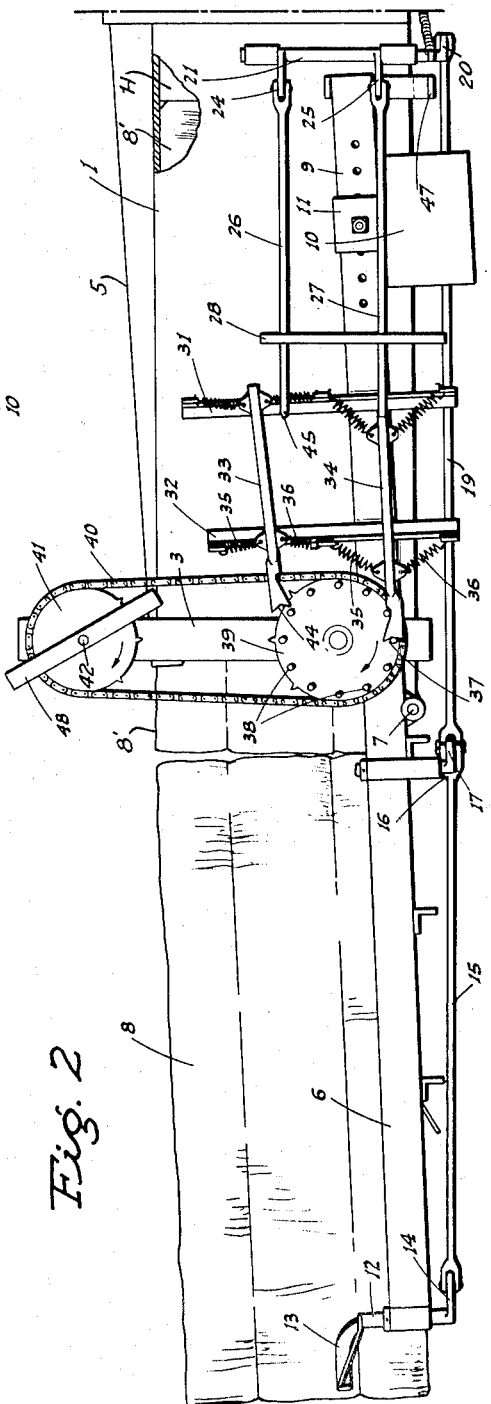
Fig. 2 is a similar view, with parts broken away and shows the positions of the parts of the device when an over-weight bale rests upon the counterbalanced scale platform.

Referring now more particularly to the characters of reference on the drawings, the numeral 1 indicates the projecting baling chamber of a conventional hay baling machine, indicated generally at 2; such baling chamber 1 including an upstanding outer end frame 3 of rectangular configuration, and a jack screw 4 extending between the upper portion of frame 3 and the top of a vertically adjustable, upper pressure plate 5 which forms the top of said baling chamber. The baling machine includes the usual head or plunger H movable through the baling chamber, as indicated in Fig. 2, the bale being formed therethrough and illustrated at 8'.

In conventional practice the jack screw 4 is manipulated, by suitable means and manually, to lower the pressure plate 5 or to raise the same, whereby to increase or decrease the tension desired in the baling chamber. This is unsatisfactory, for the reason that it requires the operator to stop the baling machine and make the manual adjustment each time that the bales become under-weight or over-weight by reason of working conditions, such as caused by dry or wet hay.

The present invention provides the following device for automatically adjusting the pressure plate 5 to increase or decrease the tension in the baling chamber 1.

An elongated, counterbalanced scale platform 6 projects longitudinally outwardly from the outer end of the baling chamber 1 at the bottom of the latter; such platform being transversely pivoted, as at 7, for rising or falling motion under the influence of an under-weight or over-weight bale 8 fed onto said platform 6 from the baling chamber 1.

The platform 6 includes, on one side thereof, an elongated, forwardly extending counterbalance beam 9 which lies along one side of the baling chamber 1 in vertically swingable relation; such counterbalance beam having a counterbalance weight 10 suspended thereon by means of a longitudinally adjustable mount 11. The counterbalance weight 10 is adjusted along the counterbalance beam 9 to a position such that the scale platform 6 assumes an intermediate position upon a normal weight bale being deposited thereon. If desired, a duplicate counterbalance beam and weight assembly may be employed on the opposite side of the baling chamber.

At the outer end, and at one corner, the scale platform 6 is fitted with a short upstanding spindle 12 fixed, at its upper end, with a trigger shoe 13 which normally projects into the path of the bale 8. As such bale starts to discharge from the scale platform 6, by reason of being pushed by the next following bale 8', said discharging bale engages the trigger shoe 13 and urges it rearwardly and laterally aside, part-rotating the spindle 12. When this occurs, a radial arm 14 on the lower end of spindle 12 swings forwardly, urging a connected, longitudinal rod 15 in a corresponding direction. The rod 15 extends forwardly for substantially the full length of the scale platform 6, and at the forward end such rod 15 is pivotally connected by a vertically loose-play clevis 16 to a radial arm 17 on a vertical spindle 18 journaled to the adjacent side of said platform 6.

In turn, another longitudinal rod 19 is pivotally connected to the radial arm 17, and thence extends forwardly to a pivotal connection with the outer end of a radial arm 20 on a vertical shaft 21 journaled to the adjacent side of the baling chamber 1 at the forward portion of the latter. The radial arm 20 is normally urged rearwardly, to set the trigger shoe 13 in the path of the bale 8, by means of a radial arm 22 fixed to the shaft 21, and connected to a tension spring 23.

The purpose of the vertically loose-play clevis 16 is to permit the scale platform 6 to rise or fall from its neutral position without limiting longitudinal motion of the connected rods 15 and 19.

A pair of vertically spaced radial arms, indicated at 24 and 25, project laterally outwardly from the shaft 21, and at their outer ends said arms are pivotally connected to the rear ends of a pair of vertically spaced, rearwardly projecting, parallel push rods 26 and 27. The push rods are supported and guided, adjacent but short of their free ends, by passage through a guide post 28 fixed in connection with the baling chamber 1 but spaced from the side thereof by brackets 29 and 30.

It will be recognized that as each bale 8 begins to discharge from the scale platform 6 and swings the trigger shoe 13, such motion will be translated by the above described mechanism into a simultaneous rearward stroke of the push rods 26 and 27. Upon the escape of the bale 8 from the scale platform 6, the tension spring 23 produces a forward stroke of said push rods and returns the described connecting rod assembly and trigger shoe to normal or starting position. The purpose of such reciprocating action of the push rods 26 and 27 will hereinafter become evident.

Immediately rearwardly of the post 28 the device includes a pair of upstanding but longitudinally spaced, parallel posts 31 and 32 fixed—at their lower end portions—to the counterbalance beam 9 for motion therewith. By reason of the bracket mounting of the post 28, as shown in Fig. 5, the counterbalance beam 9 lies inwardly thereof, and the dimensioning of the posts 31 and 32 is such that the push rods 26 and 27 work in a longitudinal vertical plane close to but laterally out from said posts 31 and 32.

Figure 1:
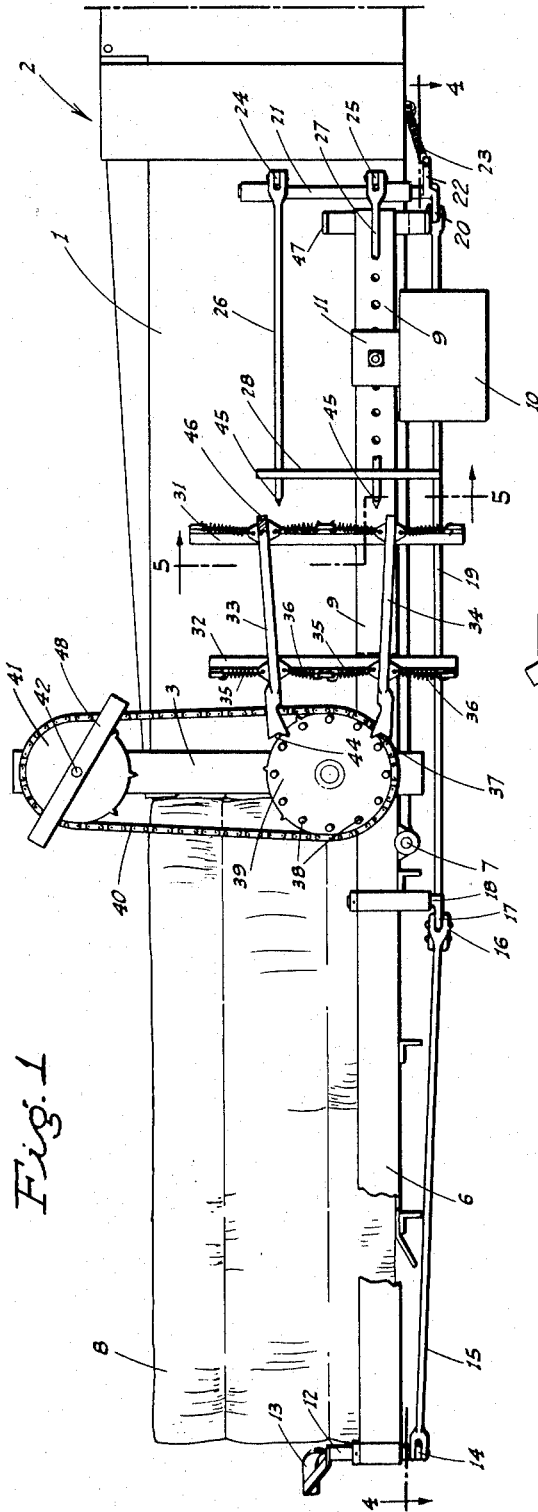
Fig. 1 is a side elevation of the device as applied to a baling machine; the parts of the device being in their neutral position; i. e., the position occupied by such parts when the bale on the counterbalanced scale platform is of normal weight.

A pair of longitudinal, vertically spaced plunger bars 33 and 34 lie in intersecting relation to the posts 31 and 32, and each of said plunger bars is supported from the adjacent posts 31 and 32 by a pair of top and bottom tension springs 35 and 36. The vertical spacing of the plunger bars 33 and 34 at their forward ends is greater than the spacing of the adjacent rear ends of the push rods 26 and 27; the forward end of the plunger bar 33 normally lying slightly above the rear end of the push rod 26, while the forward end of the plunger bar 34 normally lies slightly below the rear end of the push rod 27, as shown in Fig. 1.

Consequently, when a bale 8 of normal weight is disposed on the scale platform 6, the plunger bars 33 and 34 lie out of alinement with the push rods 26 and 27, so that reciprocation of the latter by movement of the bale 8 engaging the trigger shoe 13 has no effect on said plunger bars 33 and 34. This condition of the parts is reflected in Fig. 1.

However, upon an over-weight bale 8 resting on the scale platform 6, the latter swings downwardly, raising the counterbalance beam 9 forwardly of the pivot 7, with the result that the plunger bars 33 and 34 are correspondingly raised; the push rod 27 then alining with the plunger bar 34. In this position of the parts the rearward stroke imparted to the push rod 27 as such bale 8 engages the trigger shoe 13 and starts to discharge from the scale platform 6, is translated into a corresponding rearward stroke of the plunger bar 34. This is for the reason that push rod 27 and plunger bar 34 are then in end to end alinement.

With such rearward stroke of the plunger bar 34, and at which time the related tension springs 35 and 36 yield, the rear end of said plunger bar 34, which is notched, as at 37, engages and moves one of a circumferential row of index pins 38 which project laterally outwardly from the outer face of a sprocket 39 journaled on a transverse axis in connection with the adjacent side of the frame 3.

The index pin 38 which is thus engaged is adjacent the bottom of the sprocket 39, and the part-circle motion which is imparted to said sprocket is in the direction indicated by the arrow in Fig. 2, and which figure illustrates the above described working positions of the parts when an over-weight bale 8 rests on the scale platform 6.

Such part-circle rotation of the sprocket 39 is transferred by an endless chain 40 to another transverse axis sprocket 41 on the frame 3 at an elevated point. In turn, the sprocket 41 drives a horizontal cross shaft 42 which, through the medium of a bevel gear assembly 43 as shown in Fig. 3, part-rotates the vertical jack screw 4 in a direction to slightly raise the pressure plate 5 in the baling chamber 1.

The result of such upward adjustment of the pressure plate 5 is to decrease the tension in said baling chamber, with the result that the bale next produced is of slightly less density and of slightly reduced weight. In this way there is a reduction in the weight of the next bale toward normal, and if the weight reduction is not sufficient, the device will successively function until the reduction in the weight of the bales is to normal, whereupon the parts occupy the positions as in Fig. 1.

Upon an under-weight bale 8 resting on the scale platform 6, the counterbalance beam 9 lowers forwardly of the pivot 7, bringing push rod 26 into alinement with plunger bar 33; the result being that such plunger bar 33 has a rearward stroke imparted thereto as the under-weight bale starts to discharge from the scale platform 6, with resultant engagement and movement of the trigger shoe 13.

Upon the rearward stroke of the plunger bar 33, which bar is notched at its rear end, as at 44, said bar engages an upper one of the index pins 38 and moves it rearwardly, part-rotating the sprocket 39 in a direction contra to that previously described. This latter part-circle rotation of the sprocket 39 is transmitted by the chain 40, sprocket 41, horizontal cross shaft 42, and bevel gear assembly 43 to the jack screw 4. This turns the latter in a direction slightly lower than pressure plate 5, increasing the tension in the baling chamber 1, whereby the next bale is of greater density and weight.

As a result, the next bale is varied in weight toward normal, and if the increase in weight is not sufficient to reach normal, the device will successively function until a normal weight bale is produced.

It will thus be recognized that for either over-weight or under-weight bales delivered from the baling chamber 1 onto the scale platform 6, the device will function to automatically adjust the tension in the baling chamber to compensate for such over-weight or under-weight condition.

In order to assure of positive end to end alinement and engagement between the push rod 26 and the plunger bar 33, and between the push rod 27 and the plunger bar 34, the rear ends of said rods are pointed, as at 45, while the forward ends of said bars have sockets, one of which is shown at 46. By so pointing the rods 26 and 27 the same positively and effectively seat in the sockets 46 when the rods are in alinement with the bars during the described course of operation of the device.

In order to limit the up and down throw of the counterbalance beam 9, and which is necessary, the forward end of said beam is disposed within the confines of a C-shaped stop yoke 47 affixed to the side of the baling chamber 1.

Under certain conditions it may be desired to effect some manual adjustment, especially initially, of the vertical jack screw 4. This is accomplished by turning the horizontal cross shaft 42 by a hand lever 48 on the outer end of the latter.

From the foregoing description it will be readily seen that there has been produced such a device as substantially fulfills the objects of the invention, as set forth herein.

While this invention sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An automatic tension control device for a hay baling machine having bale pushing means and a chamber from the rear end of which the bale is pushed lengthwise and which chamber includes an adjustable pressure plate; said device comprising a bale receiving scale platform mounted on and projecting from the discharge end of the baling chamber for limited up and down motion in position to receive a bale lengthwise as the latter is pushed from the chamber, means yieldably urging the scale platform upwardly, the scale platform being disposed in an intermediate neutral position when a normal weight bale rests thereon, a reversibly rotatable member operative when rotated in one direction or the other to adjust the pressure plate to increase or decrease, respectively, the tension in the baling chamber, and mechanism actuated by movement of a bale on the scale platform and responsive to motion of the latter to an up or down position from said neutral position resulting from an under-weight or over-weight bale thereon, operative to rotate the member in one direction or the other, respectively; said mechanism including an element movably mounted on the scale platform and projecting into the path of movement of a bale being pushed onto said platform whereby said bale engages and moves said element for actuation of said mechanism.

2. An automatic tension control device, as in claim 1, in which said mechanism includes a pair of independently operative working parts, working of one part rotating the member in said one direction and working of the other part rotating the member in said other direction, and instrumentalities between said element and said working parts arranged to transmit motion of the element only to said one working part when the scale platform is in up position, and only to said other working part when the scale platform is in down position.

3. An automatic tension control device for hay baling machines having bale pushing means and a baling chamber which includes an adjustable pressure plate; said device comprising a bale receiving scale platform pivotally mounted on and projecting longitudinally from the discharge end of the baling chamber for up and down motion, a longitudinal counterbalance beam secured to the scale platform and projecting forward alongside the baling chamber, a counterbalance weight on the beam in position such that the scale platform is disposed in an intermediate neutral position when a normal weight bale rests on the scale platform, an under-weight bale permitting the scale platform to rise and an over-weight bale causing the scale platform to lower relative to said neutral position, a jack screw connected to the pressure plate, rotation of the jack screw in one direction or the other adjusting the pressure plate to increase or decrease, respectively, the tension in the baling chamber, a reversible rotary index wheel journaled on the baling chamber adjacent but clear of the counterbalance beam, said index wheel having a circumferential row of abutment elements thereon, driving connections between the index wheel and jack screw, normally retracted plunger means mounted in connection with the counterbalance beam adapted to stroke toward the index wheel to engage an abutment element and part-rotate said wheel with each stroke, the plunger means being in a position—when the counterbalance beam is lowered—to engage and move an abutment element to cause part-rotation of the index wheel in a direction to impart rotation to the jack screw in said tension increasing direction and—when the beam is raised—to engage and move an abutment element to cause part rotation of the index wheel in a direction to impart rotation to the jack screw in said tension decreasing direction, a swingable element journaled on the scale platform for engagement and swinging by a bale moving on said platform, and motion transmitting means between said swingable element and the plunger means operative to translate swinging movement of the element to a stroke of the plunger means.

4. An automatic tension control device, as in claim 3, in which the index wheel is journaled on a transverse axis and said abutment elements are a circumferential row of laterally projecting index pins; the plunger means comprising a pair of longitudinal, vertically spaced, independently movable plungers adapted on a stroke toward the index wheel to engage index pins above and below the wheel axis, respectively; and said connecting means including a pair of longitudinal, vertically spaced push rods slidably mounted in connection with the baling chamber and being simultaneously stroked from said swingable element, said push rods being adjacent but stroking out of alinement with correspondnig plungers when the scale platform is in neutral position; the upper push rod being in position to end-engage and cause a stroke of the upper plunger when the scale platform is in raised position and the counterbalance beam is in lowered position, and the lower push rod being in position to end-engage and cause a stroke of the lower plunger when the scale platform is in lowered position and the counterbalance beam is in raised position.

5. An automatic tension control device for hay baling machines having bale pushing means and a baling chamber which includes an adjustable pressure plate; said device comprising a bale receiving scale platform pivotally mounted on and projecting longitudinally from the discharge end of the baling chamber for up and down motion, a longitudinal counterbalance beam secured to the scale platform and projecting forward alongside the baling chamber, a counterbalance weight on the beam in position such that the scale platform is disposed in an intermediate position when a normal weight bale rests on the scale platform, said platform adapted to pivot to an up position when an under-weight bale is carried thereon, and said platform adapted to pivot to a down position when an over-weight bale is carried thereon, a jack screw connected to the pressure plate, rotation of the jack screw in one direction or the other adjusting the pressure plate to increase or decrease, respectively, the tension in the baling chamber, a swingable element journaled on the scale platform adapted to be engaged and swung by a bale moving on said platform, and mechanism connected between said swingable element and the jack screw operative to translate swinging motion of said element to rotary motion of the jack screw; said mechanism being inoperative when the scale platform is in said neutral position, operative to rotate the jack screw in said one direction when the scale platform is in up position, and operative to rotate the jack screw in the other direction when said scale platform is in a down position.

References Cited in the file of this patent

UNITED STATES PATENTS

| | | |
|---|---|---|
| 1,992,716 | Paxton | Feb. 26, 1935 |
| 2,397,446 | Tansley | Mar. 26, 1946 |
| 2,613,590 | Graybill | Oct. 14, 1952 |
| 2,625,097 | Almquist | Jan. 13, 1953 |